(12) United States Patent
Zhu

(10) Patent No.: US 6,768,838 B2
(45) Date of Patent: Jul. 27, 2004

(54) OPTICAL MODULE

(75) Inventor: Xiaofan Zhu, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 318 days.

(21) Appl. No.: 09/966,097

(22) Filed: Oct. 1, 2001

(65) Prior Publication Data

US 2002/0041732 A1 Apr. 11, 2002

(30) Foreign Application Priority Data

Oct. 3, 2000 (JP) .................................... P2000-303813

(51) Int. Cl.$^7$ ................................................ G02B 6/32
(52) U.S. Cl. ............................ 385/34; 385/33; 385/31; 385/123; 385/124
(58) Field of Search ............................. 385/33, 34, 31, 385/123, 124, 115, 116

(56) References Cited

U.S. PATENT DOCUMENTS

| | | | | |
|---|---|---|---|---|
| 4,331,380 A | * | 5/1982 | Rees et al. ................... | 385/116 |
| 4,589,736 A | * | 5/1986 | Harrigan et al. ............. | 359/652 |
| 5,953,162 A | * | 9/1999 | Blankenbecler ............. | 359/653 |
| 5,960,132 A | * | 9/1999 | Lin ............................... | 385/18 |
| 6,424,759 B1 | * | 7/2002 | Jing ............................. | 385/17 |
| 6,526,196 B1 | * | 2/2003 | Li ................................. | 385/18 |
| 2002/0021868 A1 | * | 2/2002 | Mandella ..................... | 385/34 |
| 2003/0128437 A1 | * | 7/2003 | Sato et al. ................... | 359/641 |

* cited by examiner

Primary Examiner—Brian M. Healy
(74) Attorney, Agent, or Firm—Whitham, Curtis & Christofferson, P.C.

(57) ABSTRACT

An optical module for optically coupling an input side and an output side with each other through an optically functional portion inserted between the input side and the output side. At least one of the input side and the output side includes a plurality of collimators. At least one of the collimators is made different from the other collimators in at least one of the distance between the focal point of a corresponding lens and a corresponding light exit or incident surface, the numerical aperture of the light exit or incident surface, the effective focal length of the lens, the wavelength used and the distance between optical axes of adjacent ones of the collimators so that the size and position of a beam waist on an input side are made substantially coincident with those on an output side. In the case of a fiber collimator 14 constituted by a combination of a lens 12 and an optical fiber 10, an end surface of the optical fiber serves as a light exit or incident surface and the mode field diameter of the optical fiber also serves as one of variable characteristic parameters.

14 Claims, 2 Drawing Sheets

OPTICAL MODULE

BACKGROUND OF THE INVENTION

The present invention relates to an optical module having a structure in which an input side and an output side disposed to be separated from each other by a free space are optically coupled to each other through an optically functional portion inserted between the input side and the output side. In more detail, it relates an optical module in which at least one of the input side and the output side has a plurality of collimators at least one of which is made different from the other collimators in at least one variable characteristic parameter to thereby achieve optimum optical coupling between the input side and the output side. For example, the present invention is useful for a matrix optical switch, an optical multiplexer/demultideplexer, an optical tap, and so on.

As well known, a collimator is used in an optical technology in order to convert divergent light from an exit surface of a light-emitting device or an optical fiber to approximately collimated beams, or contrariwise in order to converge the collimated beams on an incident surface of a photodetector or an optical fiber. When two or more collimators as described above are disposed and an optical device of any kind is inserted in a free space through which the magnified beams pass, an optical module can be formed.

In such an optical module, in many cases, the beam diameter may be small and the free space lengths between channels or ports may different from one another in accordance with the channels.

In the background art, however, coupling characteristic of the collimators is not optimized in such a case. For example, a collimator array had a structure in which a required number of collimators of the same kind were simply arranged side by side at regular intervals (so as to make the distance between optical axes of adjacent collimators equal to one another).

If an optical module is configured by use of collimators of the same kind in the case where free space lengths between channels or ports are different from one another, it is however difficult to achieve low insertion loss and low insertion loss deviation even within a light diffraction limit. There, however, arises a problem that low insertion loss and low insertion loss deviation is hardly achieved even in a diffraction limited of the light so that the size of the optical module can hardly be reduced. This problem is caused by the fact that optical coupling cannot be optimized in accordance with channels or ports, the fact that loss is constrained severely so that further light diffraction loss due to small beams used cannot be allowed, the fact that small-size collimators cannot be used in spite of channels or ports small in free space, and so on.

SUMMARY OF THE INVENTION

An object of the present invention is to provide various kinds of optical modules small in size, low in insertion loss and low in insertion loss deviation in the case where free space lengths are different from one another between channels or ports.

According to the present invention, there is provided an optical module constituted by a light input side, a light output side disposed to be separated by a free space from the input side, and an optically functional portion inserted between the input side and the output side so that the input side and the output side are optically coupled to each other through the optically functional portion. In the present invention, at least one of the input side and the output side includes a plurality of collimators; and at least one of the collimators is made different from the other collimators in at least one variable characteristic parameter selected from parameters such as a distance between a focal point of a lens and a light exit or incident surface, a numerical aperture of the light exit or incident surface, an effective focal length of the lens, a wavelength used and a distance between optical axes of adjacent ones of the collimators, so that size and position of a beam waist on the input side are made approximately coincident with those on the output side. Here, the light exit surface means a light-emitting surface of a light-emitting device, an end surface of an optical fiber, or the like, whereas the light incident surface means a photodetection surface of a photodetector, an end surface of an optical fiber, or the like.

In the case where a plurality of optical fiber collimators each constituted by a combination of a lens and an optical fiber are provided on at least one of the input side and the output side, at least one of the fiber collimators is made different from the other fiber collimators in at least one variable characteristic parameter selected from parameters such as a distance between a focal point of a lens and an end surface of the optical fiber, a mode field diameter or numerical aperture of the optical fiber, an effective focal length of the lens, a wavelength used and a distance between optical axes of adjacent ones of the fiber collimators, so that size and position of a beam waist on the input side are made approximately coincident with those on the output side.

Hence, such a plurality of fiber collimators may be provided only on the input side or only on the output side or maybe provided on both the input side and the output side. When the plurality of fiber collimators are provided only on the input side, the output side may be constituted by a combination of a collimator lens and a photodetector. When the plurality of collimators are provided only on the output side, the input side may be constituted by a combination of a light-emitting device and a collimator lens. Alternatively, configuration may be made without using any fiber collimator so that the input side is constituted by a combination of a light-emitting device and a collimator lens whereas the output side is constituted by a combination of a collimator lens and a photodetector.

For example, there is a configuration in which the plurality of collimators disposed on at least one of the input side and the output side have a lens array constituted by a plurality of gradient index rod lenses. In the case of having such a configuration, either or each of opposite end surfaces of the lens array is provided as an oblique surface with respect to a direction of arrangement of the array to thereby adjust the variable characteristic parameter. Further, in the case where the plurality of fiber collimators are disposed on at least one of the input side and the output side, there is a configuration in which the plurality of fiber collimators are constituted by a combination of a lens array of a plurality of gradient index rod lenses and a fiber array of a plurality of optical fibers. In the case of having such a configuration, either or both of opposite end surfaces of the lens array and/or an end surface of the fiber array are provided as oblique surfaces with respect to a direction of arrangement of the array to thereby adjust the variable characteristic parameter. Further, it is effective to allocate longer wave to a channel longer in free space length.

Specifically, for example, collimators are provided on each of the input side and the output side, the collimators on the output side are disposed at an angle of 90 degrees with respect to the collimators on the input side, and a movable mirror is inserted in a position corresponding to each channel in the free space, so that a matrix optical switch can be formed. In such a case, it is desirable to have a configuration in which points of intersection between optical axes of the input side and optical axes of the output side are set to be equivalent to lattice points of a square lattice, movable mirrors are disposed at the lattice points respectively, and adjustment is made so that beam waists are formed on a diagonal line of the square lattice.

In the configuration in which the input side and the output side disposed to be separated from each other by a free space are optically coupled to each other through an optically functional portion inserted between the input side and the output side, an optical device constituted by either of a filter and a semi-transparent mirror is used as the optically functional portion, and adjustment is made in such a manner that beam waists as equal to one another as possible are formed on the optical device. In such a manner, an optical multiplexer/demultiplexer or an optical tap can be formed.

For example, a fiber collimator with two fibers is disposed on one side whereas a fiber collimator with single fiber is disposed on an opposite side to the side, a filter is provided as the optical device in a free space, one of optical fibers in the fiber collimator with two fibers is provided as an input side whereas the other optical fiber is provided as an output side, an optical fiber in the collimator with single fiber is provided either as an input side or as an output side, and adjustment is made in such a manner that beam waists as equal to one another as possible are formed on a filter surface. In such a manner, an optical multiplexer or an optical demultiplexer can be formed. Further, a fiber collimator with two fibers is disposed on one side whereas a fiber collimator with single fiber is disposed on the opposite side, a semi-transparent mirror is provided as an optical device in a free space, one of optical fibers in the fiber collimator with two fibers is provided as an input side whereas the other optical fiber is provided as an output side, an optical fiber in the collimator with single fiber is provided as an output side, and adjustment is made in such a manner that beam waists of the fiber collimators as equal to one another as possible are formed on the semi-transparent mirror. In such a manner, an optical tap can be formed.

The present disclosure relates to the subject matter contained in Japanese patent application No. 2000-303813 (filed on Oct. 3, 2000), which is expressly incorporated herein by reference in its entirety.

DESCRIPTION OF THE PREFERRED EMBODIMENT

As described above, variable characteristic parameters in each collimator are the distance between the focal point of the lens and the light exit or incident surface, the numerical aperture of the light exit or incident surface, the effective focal length of the lens, the wavelength used and the distance between the optical axes of adjacent collimators. In the case of fiber collimators, as described above, the variable characteristic parameters thereof are the distance between the focal point of a lens and an end surface of an optical fiber, the mode field diameter or numerical aperture of the optical fiber, the effective focal length of the lens, the wavelength used and the distance between the optical axes of adjacent fiber collimators.

Figure 1:
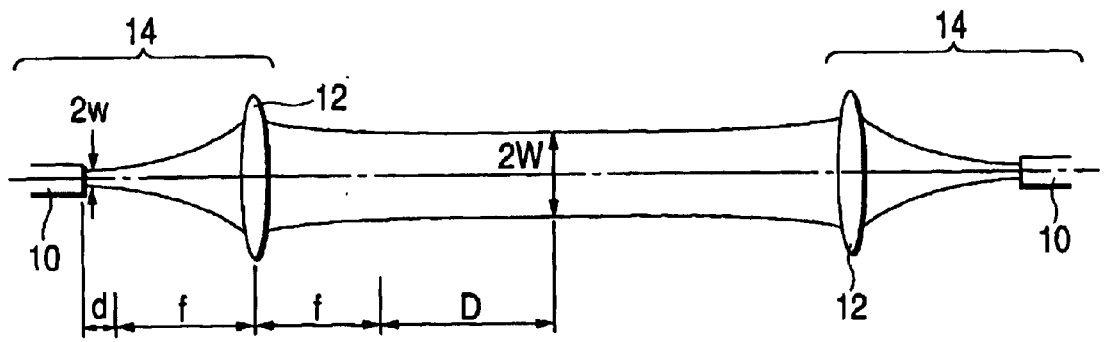
FIG. 1 is an explanatory view of a fiber collimator coupling system.

Here, a method of setting those variable characteristic parameters will be described below in the case where the input side and the output side are constituted by fiber collimators respectively by way of example. As shown in FIG. 1, in a fiber collimator coupling system in which a pair of fiber collimators 14 each constituted by a combination of an optical fiber 10 and a lens 12 are arranged to face each other, equations of propagation from a spot size 2w to a beam waist 2W which expresses basic characteristic are as follows.

$$D = f^2 d/(d_m^2 + d^2)$$

$$W = wf/(d_m^2 + d^2)^{1/2}$$

In the equations, $\underline{f}$ is the effective focal length of each lens, $d_m$ is equal to $nw^2/\lambda$, and $\lambda$ is the wavelength. To make optical coupling good, the position and size of the beam waist in one fiber collimator is made coincident with those in the other fiber collimator. Hence, when the distance $\underline{d}$ between the optical fiber and the focal length of the lens, the spot size $\underline{w}$ of the optical fiber, the focal length $\underline{f}$ of the lens and the wave length $\lambda$ are changed, optimization of coupling efficiency can be attained.

For example, to enlarge the distance D between the focal point of the lens and the position of the beam waist, at least one of the following conditions is selected.

(1) large $\underline{d}$ in a range of $0 < d < d_m$
(2) small $\underline{d}$ in a range of $d_m < d$
(3) small $\underline{w}$
(4) large $\underline{f}$
(5) large $\lambda$ Because there is a tendency that the effective focal length $\underline{f}$ increases as the wavelength $\lambda$ increases, the distance D (between the focal point of the lens and the position of the beam waist) increases more greatly if the wavelength $\lambda$ increases. Therefore, parameters are allocated to channels or ports long in free space so that the distance D increases as described above.

Any suitable lens can be used as the lens used in each of the collimators. The lens may be a convex or spherical lens made of a homogeneous material or may be a gradient index rod lens. As described above, in the case of fiber collimators, adjustment is made so that at least one channel differs from the other channels in at least one variable characteristic parameter selected from parameters such as the distance between the focal point of the lens and the end surface of the optical fiber, the mode field diameter or numerical aperture of the optical fiber, the effective focal length and size (inclusive of the distance between optical axes of adjacent fiber collimators). In any case, collimators of the same kind may be used in part of the channels. If each variable characteristic parameter is changed, it may be theoretically possible in some cases and theoretically impossible in other cases to make the sizes and positions of the beam waists completely coincident with each other in the whole of the optical module. In the case where it is theoretically possible, the sizes and positions of the beam waists are made as coincident as possible in terms of tolerance and assembling accuracy of parts. Even in the case of theoretically impossible combination, it is preferable that the state is made as close to the ideal state as possible.

Figure 2:
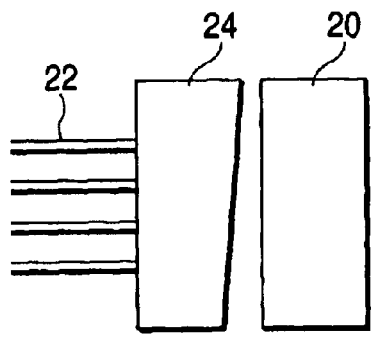
FIGS. 2(A) to 2(C) are explanatory views showing examples of a collimator array constituted by a combination of a fiber array and a lens array.
Figure 2:
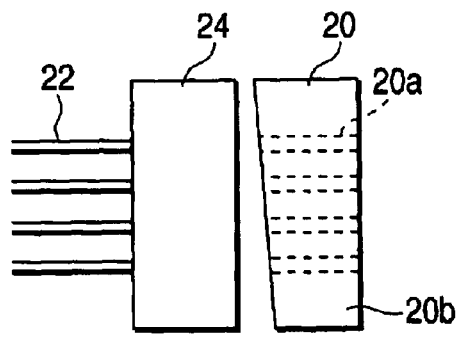
Figure 2:
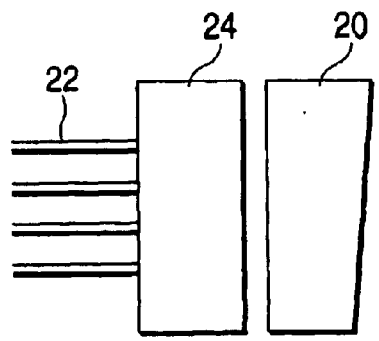

FIGS. 2(A) to 2(C) show examples of adjustment of the variable characteristic parameters. These examples show the case where a lens array 20 constituted by a plurality of gradient index rod lenses is combined with a fiber array 24 constituted by a plurality of optical fibers 22. FIG. 2(A) shows an example in which an end surface of the fiber array 24 is polished obliquely with respect to the direction of arrangement of the array. FIG. 2(B) shows an example in which an end surface (facing the fiber array) of the lens array 20 is polished obliquely with respect to the direction of arrangement of the array. In such a manner, the distance between the focal point of each lens and the end surface of a corresponding optical fiber can be adjusted. FIG. 2(C) shows an example in which the other end surface of the lens array 20 is polished obliquely with respect to the direction of arrangement of the array. When each lens is a gradient index rod lens, the distance between the focal point of the lens and the end surface of the optical fiber can be adjusted also in this manner. When an oblique surface is provided as described above, there arises an effect that the intensity of light fed back to the optical fiber is attenuated. Incidentally, when the quantity of attenuation is intended to be made larger, an oblique surface with respect to a direction perpendicular to the direction of arrangement of the array may be preferably provided. In this case, the angle of the inclined surface with respect to a plane perpendicular to the optical axis is preferably set to be in a range of from 1 to 20 degrees. The structure in which an end surface of the lens array is provided as an oblique surface as shown in FIG. 2(B) or 2(C) can be applied also to the case where the lens array is combined with a light-emitting device or a photodetector without using any optical fiber.

In each of the examples shown in FIGS. 2(B) and 2(C), a rod lens array 20 is in the form of a wedge shape, and constructed by a plurality of gradient index rod lenses 20a arrayed in at least one row (in each example, arrayed in one row), and each extending in parallel to an optical axis direction; and a frame 20b supporting the gradient index rod lenses 20a. The frame 20b has a first end surface perpendicular to the optical axial direction, and a second end surface inclined with respect to the optical axial direction. An end surface of each of the gradient index rod lenses 20a is flush with the second end surface of the frame 20b. An opposite end surface of each said gradient index rod lens 20a is flush with the first end surface of said frame 20b. In the example shown in FIG. 2(B), the inclined second end surface of the frame 20b and the inclined end surfaces of the gradient index rod lenses 20a are confronted with the end surface of the fiber array 24. In the example shown in FIG. 2(C), the inclined second end surface of the frame 20b and the inclined end surfaces of the gradient index rod lenses 20a are located opposite from the end surface of the fiber array 24. In addition, in the example shown in FIG. 2(C), the lens array 20 and the fiber array 24 may be formed integrally by using a common frame.

In the case of a gradient index rod lens with a length L, the refractive-index profile in the direction of the radius (distance r) is given by the following expression:

$$n(r)=n_0(1-Ar^2/2)$$

The effective focal length $\underline{f}$ is given by the following expression:

$$f=1/(\sin(LA^{1/2})n_0A^{1/2})$$

in which $A^{1/2}$ is a coefficient of refractive index distribution. Hence, in the configuration shown in FIG. 2(B) or 2(C), the effective focal length f can be also adjusted in the same manner as described above. Alternatively, the lens lengths may be equalized to one another if $n_0$ or $A^{1/2}$ in at least one channel can be made different from those in the other channels.

To change the mode field diameter or numerical aperture of a fiber collimator, there is a method of changing the kind of the optical fibers or heating and deforming end portions of the optical fibers to magnify the end portions. When the respective variable characteristic parameters are changed, the size of parts used is changed. As a result, there arises a secondary effect that the size of the optical module is reduced. When a planar microlens array or the like is used as an array of lenses, the shape of a mask or mold for forming each of the lenses is changed to thereby adjust the effective focal length or size (including the pitch for arrangement of the lenses).

EXAMPLES

Figure 3:
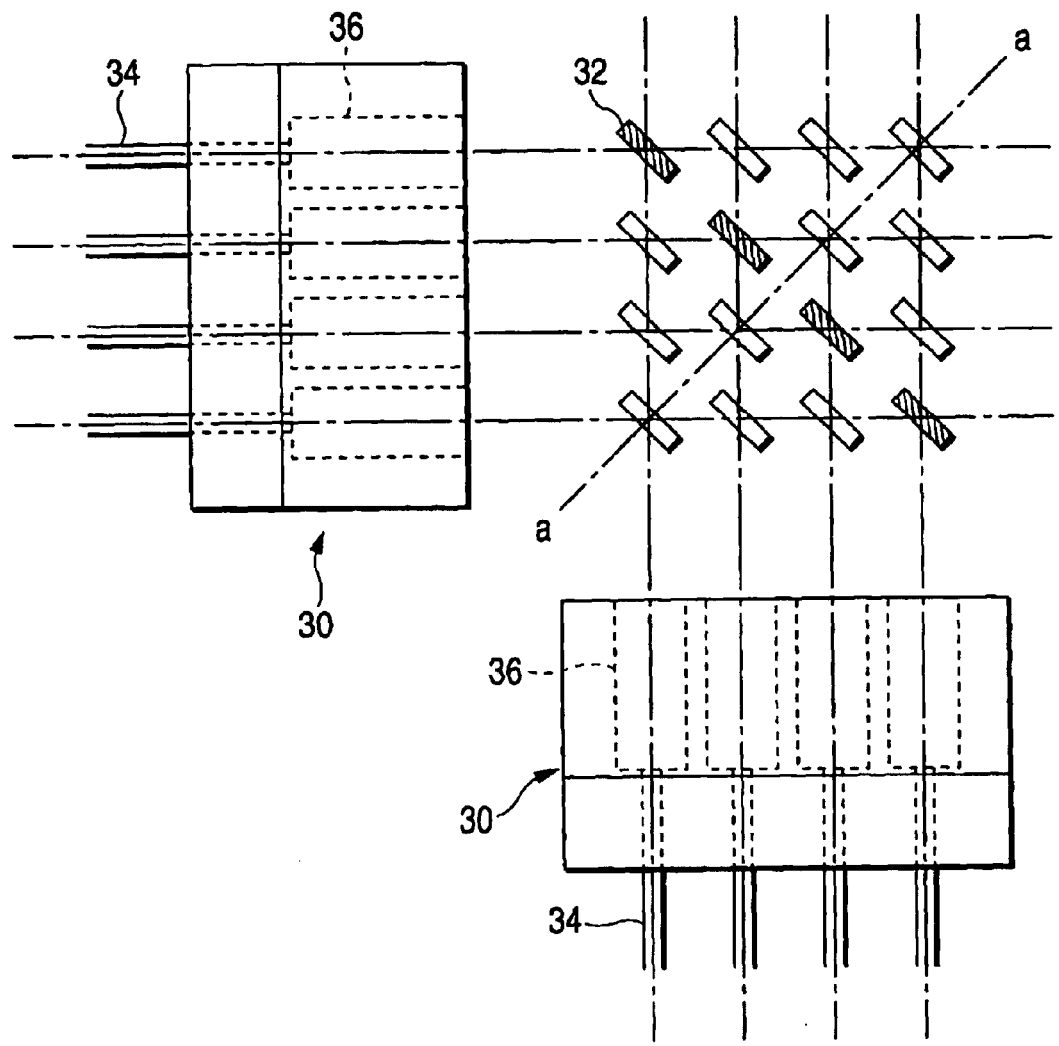
FIG. 3 is an explanatory view showing an example of an optical module according to the present invention.

FIG. 3 is an explanatory view showing an example of the optical module according to the present invention. This example shows the case where the present invention is applied to a 4×4 matrix optical switch. Two collimator arrays 30, which serve as the input side and the output side respectively, are arranged at angles different by 90 degrees from each other. Movable mirrors 32 are inserted in respective positions corresponding to channels in a free space. Each of the collimator arrays 30 has a structure in which a fiber array and a lens array are integrated with each other. The fiber array is constituted by four optical fibers 34 arranged side by side. The lens array is constituted by four gradient index rod lenses 36 arranged side by side. Here, in the respective channels, the position and size of the beam waist on an input side are made as coincident with those on an output side as possible. As the most preferred example, points of intersection between the optical axes of the input side and the optical axes of the output side are set to be equivalent to lattice points of a square lattice so that the movable mirrors 32 are arranged at the lattice points respectively and adjusted in such a manner that beam waists are formed on a diagonal line (cross line a—a) of the square lattice. Incidentally, in FIG. 3, movable mirrors expressed by the slanting lines among the large number of movable mirrors are performing light reflecting operation. When the operation of each movable mirror is controlled, the optical path can be switched to a desired one.

Examples of the optical module according to the present invention may include: an optical demultiplexer module in which a filter is used as the optically functional portion while a single collimator is disposed on the input side and a plurality of collimators are disposed on the output side; an optical multiplexer module in which a filter is used as the photofuctional portion while a plurality of collimators are disposed on the input side and a single collimator is disposed on the output side; an optical tap module using semitransparent mirrors as the optically functional portion; and so on. Also in each of these modules, the variable characteristic parameters are changed so that the position and size of the beam waist in one collimator is made as coincident with those in another collimator as possible.

Figure 4:
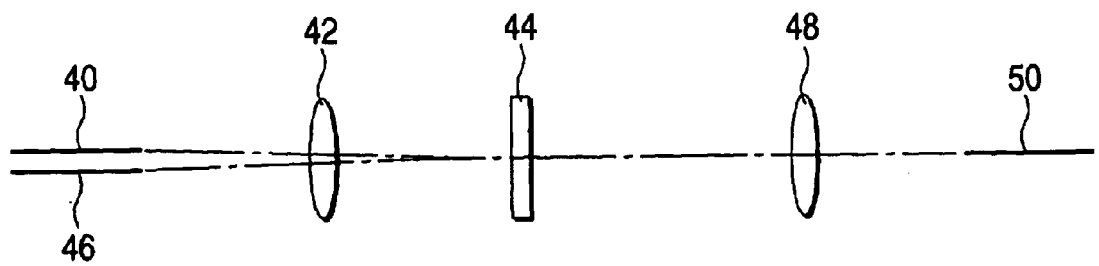
FIG. 4 is an explanatory view showing another example of the optical module according to the present invention.

FIG. 4 shows an example of a three-port optical module constituted by a combination of a fiber collimator with two fibers and a fiber collimator with single fiber. Light emitted from one 40 of two optical fibers which are fixed to one capillary and which are parallel to each other is magnified by a first lens 42. The light is reflected by a plane optical device (filter) 44 and condensed by the first lens 42. Thus, the condensed light enters the other optical fiber 46. Light transmitted through the optical device 44 is condensed by a second lens 48. Thus, the condensed light enters the optical fiber 50. The optical device (filter) 44 is disposed at the focal point of the first lens 42. Beam waists as equal to one another as possible are formed on the reflection surface of the optical device (filter) 44 by all the fiber collimators. In this case, end surfaces of the two fibers are located at the other-side focal point of the first lens. An optical demultiplexer can be achieved by the aforementioned configuration. If the input side and the output side are replaced by each other, an optical multiplexer can be achieved by the same configuration as described above.

A semi-transparent mirror may be used as the optical device 44. In this case, an optical tap can be configured to have the input-output relation the same as that in the optical multiplexer. Also in this case, beam waists as equal to each other as possible are formed on the optical device by all the fiber collimators.

Although the respective embodiments have shown the case where fiber collimators are used both on the input side and on the output side, the present invention may be applied also to the case where a combination of a light-emitting device such as a laser diode and a collimator lens is used on the input side, the case where a combination of a collimator lens and a photodetector such as a photodiode is used on the output side, and so on.

EFFECT OF THE INVENTION

As described above, in accordance with the present invention, at least one collimator constituting an optical module is made different from the other collimator in at least one variable characteristic parameter. Hence, an optical module which is small in size, low in insertion loss and low on insertion loss deviation to obtain optimum optical coupling can be achieved in the case where channels or ports are different from one another in free space length.

What is claimed is:

1. An optical module comprising a light input side, a light output side disposed to be separated by a free space from said input side, and an optically functional portion inserted between said input side and said output side so that said input side and said output side are optically coupled to each other through said optically functional portion, wherein:
    at least one of said input side and said output side includes a plurality of collimators; and
    at least one of said collimators is made different from the other collimators in at least one variable characteristic parameter selected from parameters such as a distance between a focal point of a lens and a light exit or incident surface, a numerical aperture of the light exit or incident surface, an effective focal length of the lens, a wavelength used and a distance between optical axes of adjacent ones of said collimators so that size and position of a beam waist on said input side are made approximately coincident with those on said output side.

2. An optical module according to claim 1, wherein:
    at least one of said input side and said output side includes a plurality of optical fiber collimators each constituted by a combination of a lens and an optical fiber; and
    at least one of said fiber collimators is made different from the other fiber collimators in at least one variable characteristic parameter selected from parameters such as a distance between a focal point of a lens and an end surface of the optical fiber, a mode field diameter or numerical aperture of the optical fiber, an effective focal length of the lens, a wavelength used and a distance between optical axes of adjacent ones of said fiber collimators so that size and position of a beam waist on said input side are made approximately coincident with those on said output side.

3. An optical module according to claim 1, wherein:
    said plurality of collimators disposed on at least one of said input side and said output side have a lens array constituted by a plurality of gradient index rod lenses; and
    either or each of opposite end surfaces of said lens array is provided as an oblique surface with respect to a direction of arrangement of said array to thereby adjust said variable characteristic parameter.

4. An optical module according to claim 2, wherein:
    said plurality of fiber collimators disposed on at least one of said input side and said output side are constituted by a combination of a lens array of a plurality of gradient index rod lenses and a fiber array of a plurality of optical fibers; and
    either or both of opposite end surfaces of said lens array and/or an end surface of said fiber array are provided as oblique surfaces with respect to a direction of arrangement of said array to thereby adjust said variable characteristic parameter.

5. An optical module according to any one of claims 1 through 4, wherein longer wave is allocated to a channel longer in free space length.

6. An optical module according to any one of claims 1 through 4, wherein:
    said output side is disposed at an angle of 90 degrees with respect to said input side; and
    a movable mirror is inserted in a position corresponding to each channel in said free space to thereby form a matrix optical switch.

7. An optical module according to claim 6, wherein:
    points of intersection between optical axes of said input side and optical axes of said output side are set to be equivalent to lattice points of a square lattice;
    movable mirrors are disposed at said lattice points respectively; and
    adjustment is made so that beam waists are formed on a diagonal line of said square lattice.

8. An optical module according to claim 1 or 2, wherein an optical device constituted by either of a filter and a semi-transparent mirror is used as said optically functional portion, and adjustment is made in such a manner that beam waists as equal to one another as possible are formed on said optical device, so that an optical multiplexer/demultiplexer or an optical tap is formed.

9. An optical module according to claim 2, wherein an optical fiber collimator with two fibers is disposed on one side whereas an optical fiber collimator with single fiber is disposed on an opposite side to said side so as to face the fiber collimator with two fibers, a filter is provided as said optical device in a free space formed between said collimators with single fiber and said collimators with two fibers, one of optical fibers in the fiber collimator with two fibers is provided as an input side whereas the other optical fiber is provided as an output side, an optical fiber in the collimator with single fiber is provided either as an input side or as an output side, and adjustment is made in such a manner that beam waists as equal to one another as possible are formed on a filter surface, so that an optical multiplexer or an optical demultiplexer is formed.

10. An optical module according to claim 2, wherein a fiber collimator with two fibers is disposed on one side whereas a fiber collimator with single fiber is disposed on the opposite side so as to face the fiber collimator with two fibers, a semi-transparent mirror is provided as an optical device in a free space between the fiber collimator with two fibers and the fiber collimator with single fiber, one of optical fibers in the fiber collimator with two fibers is provided as an input side whereas the other optical fiber is provided as an output side, an optical fiber in the collimator with single fiber is provided as an output side, and adjustment is made in such a manner that beam waists as equal to one another as possible are formed on said semi-transparent mirror, so that an optical tap is formed.

11. An optical module according to claim 9 or 10, wherein longer wave is allocated to channels larger in free space length.

12. A wedge-shaped rod lens array comprising:
- a plurality of gradient index rod lenses arrayed in at least one row, and each extending in parallel to an optical axis direction;
- a frame supporting the gradient index rod lenses, and having a first end surface perpendicular to the optical axial direction, and a second end surface inclined with respect to the optical axial direction,
- wherein an end surface of each said gradient index rod lens is flush with said second end surface of said frame.

13. A wedge-shaped rod lens array according to claim 12, wherein an opposite end surface of each said gradient index rod lens is flush with the first end surface of said frame.

14. A wedge-shaped rod lens array according to claim 12, further comprising:
- a plurality of optical fibers supported by the frame, and respectively aligned with respect to said gradient index rod lenses,
- wherein said optical fibers extend outwardly from said first end surface of said frame.

* * * * *